United States Patent
Nguyen (10) Patent No.: US 7,777,469 B2
(45) Date of Patent: Aug. 17, 2010

(54) CONVERTER HAVING PWM RAMP ADJUSTABLE IN DISCONTINUOUS MODE OPERATION

(75) Inventor: Huy Nguyen, Raleigh, NC (US)

(73) Assignee: International Rectifier Corporation, El Segundo, CA (US)

( * ) Notice: Subject to any disclaimer, the term of this patent is extended or adjusted under 35 U.S.C. 154(b) by 226 days.

(21) Appl. No.: 12/165,992

(22) Filed: Jul. 1, 2008

(65) Prior Publication Data

US 2010/0001706 A1 Jan. 7, 2010

(51) Int. Cl.
G05F 1/652 (2006.01)
G05F 1/656 (2006.01)

(52) U.S. Cl. .................. 323/282; 323/284; 323/285; 323/286; 323/288; 323/222

(58) Field of Classification Search .............. 323/282, 323/284, 285, 286, 288, 222, 224
See application file for complete search history.

(56) References Cited

U.S. PATENT DOCUMENTS

| | | | | |
|---|---|---|---|---|
| 6,034,513 A | * | 3/2000 | Farrington et al. | 323/222 |
| 7,323,828 B2 | * | 1/2008 | Russell et al. | 315/291 |
| 7,432,614 B2 | * | 10/2008 | Ma et al. | 307/31 |
| 7,595,623 B2 | * | 9/2009 | Bennett | 323/288 |

* cited by examiner

Primary Examiner—Bao Q Vu
(74) Attorney, Agent, or Firm—Farjami & Farjami LLP (57) ABSTRACT

A ramp adjustment circuit for a voltage converter including a gate driver for controlling series connected high- and low-side switches connected across DC voltage and coupled at an output node connected to a load through an inductor such that the converter operates in a continuous conduction mode (CCM) or a discontinuous conduction mode (DCM). The circuit includes a first current generating circuit for providing a first current signal for generating a first ramp signal; a second current generating circuit for providing a second reduced current signal for generating a second ramp signal having a reduced slope when the first current generating circuit is disabled and the second current generating circuit is enabled; and a circuit for enabling the first current generating circuit and disabling the second current generating circuit when the converter is in CCM and enabling the second current generating circuit and disabling the first current generating circuit when the converter is in DCM thereby providing the first current signal when the converter is in CCM to provide the first ramp signal and providing the second reduced current signal when the converter is in DCM to provide the second reduced slope ramp signal.

10 Claims, 8 Drawing Sheets

CONVERTER HAVING PWM RAMP ADJUSTABLE IN DISCONTINUOUS MODE OPERATION

BACKGROUND OF THE INVENTION

The present invention relates to synchronous buck converters and more particularly to improving the efficiency of synchronous buck converters in the discontinuous conduction mode (DCM) and continuous conduction mode (CCM) operations.

Figure 1:
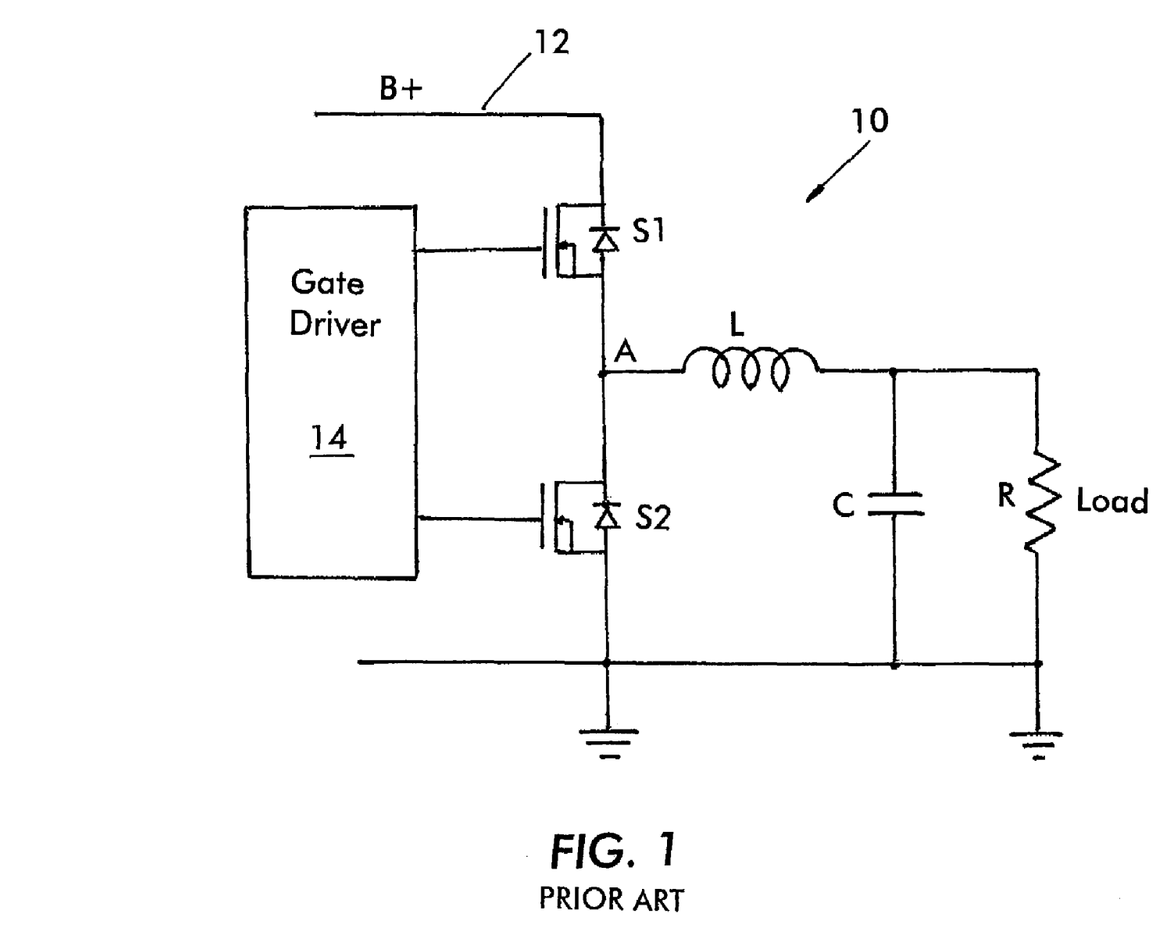
FIG. 1 is a circuit diagram of a conventional synchronous buck converter.

As illustrated in FIG. 1, a synchronous buck converter 10 includes a switching stage 12 having high (control)- and low-side (synchronous) switches S1 and S2, e.g., MOSFETs, series connected at a switching node A across a DC supply B+. An inductor L is connected between the switching node and an output filter capacitor C across which is coupled a load R. The high- and low-side switches S1 and S2 include gate terminals, which are controlled by a gate driver 14 and are switched complementarily.

The buck converter operates in CCM if the current through the inductor L does not fall to zero during the switching cycle. The buck converter operates in DCM where the load energy requirement is light.

The switching ON time in the converter is determined by a ramp slope. In commonly used synchronous buck converters, the switching ON time is the same in both DCM and CCM. When a synchronous buck converter is in DCM, the higher slew rate of the ramp will require higher cycle switching frequency than necessary to support the load. However, the higher cycle switching frequency presents larger power losses due to the high switching rate. What is needed is an adjustment to the slope of the ramp when the synchronous buck converter is in DCM.

SUMMARY OF THE INVENTION

It is an object of the present invention to improve the efficiency of converters in DCM at light load by varying the cycle switching frequency, which depends on the output converter current.

It is an object of the present invention to improve the efficiency of converters in CCM at a fixed switching frequency at light load.

It is another object of the present invention to adjust the slope of the ramp by lowering the slope when the converter is in DCM, which introduces a longer ON-time and lets the converter operate at a lower cycle switching frequency to support the load, thereby improving the efficiency.

Provided is a ramp adjustment circuit for a voltage converter including a gate driver for controlling series connected high- and low-side switches connected across a DC voltage and coupled at an output node connected to a load through an inductor such that the converter operates in a continuous conduction mode (CCM) or a discontinuous conduction mode (DCM). The circuit includes a first current generating circuit for providing a first current signal for generating a first ramp signal; a second current generating circuit for providing a second reduced current signal for generating a second ramp signal having a reduced slope when the first current generating circuit is disabled and the second current generating circuit is enabled; and a circuit enabling the first current generating circuit and disabling the second current generating circuit when the converter is in CCM and enabling the second current generating circuit and disabling the first current generating circuit when the converter is in DCM thereby providing the first current signal when the converter is in CCM to provide the first ramp signal and providing the second reduced current signal when the converter is in DCM to provide the second reduced slope ramp signal.

Other features and advantages of the present invention will become apparent from the following description of the invention that refers to the accompanying drawings.

DETAILED DESCRIPTION OF EMBODIMENTS OF THE INVENTION

The total power loss in a converter, e.g., the synchronous buck converter 10 of FIG. 1, includes power dissipation of the controller, i.e., the gate driver that turns ON and OFF the upper and lower switches and the power dissipated in the components, e.g., the inductor, the switches, and input and output capacitors. The power components of the converter are selected to be able to sustain a maximum output current. At maximum current, the power loss of the gate driver is typically equal to 3% of the total power loss.

When operating in DCM with 1% of full load current, the gate driver still needs to turn on the upper and lower switches. The power loss for the gate driver then is close to 25% of the total power loss. This gate driver power loss is proportional to the switching frequency. Adjusting the slope of the ramp when the converter 10 is operating in DCM enables achievement of the goal of improving the efficiency of the converter in DCM.

Figure 2:
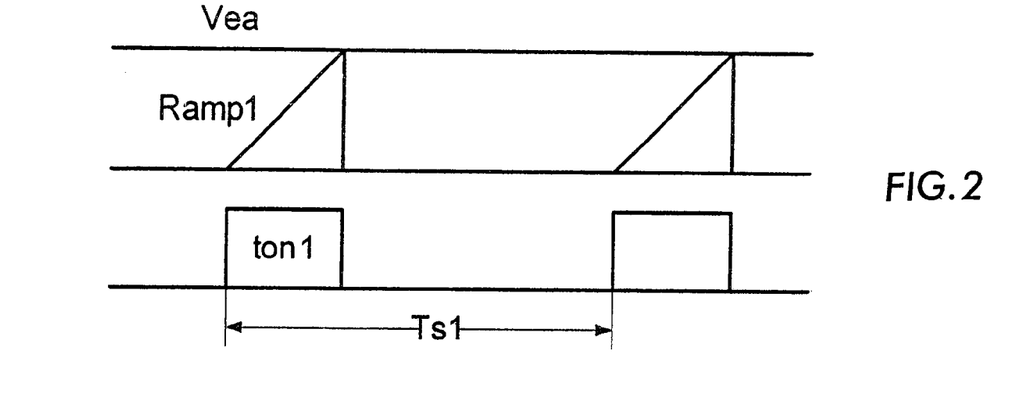
FIG. 2 is a graph showing the ramp signal for the prior art circuit in both CCM and DCM.

As illustrated in FIG. 2, during the steady state DCM, the upper switch S1 illustratively is turned ON at the start of Ramp1 and turned OFF when the output voltage $V_{ea}$ of an error amplifier that controls the generated pulse width modulation (PWM) signals crosses the ramp signal. The "ton1" signal going HIGH indicates turning ON of switch S1 and the length of time that the "ton1" signal stays HIGH is the duration of switch S1 being kept ON. Ts1 indicates the cycle switching period, i.e., the time elapsed between the subsequent "ton1" signals going HIGH and turning ON switch S1. In the prior art circuit, the ramp signal, as shown in FIG. 2, is the same for CCM and DCM.

Figure 2A:
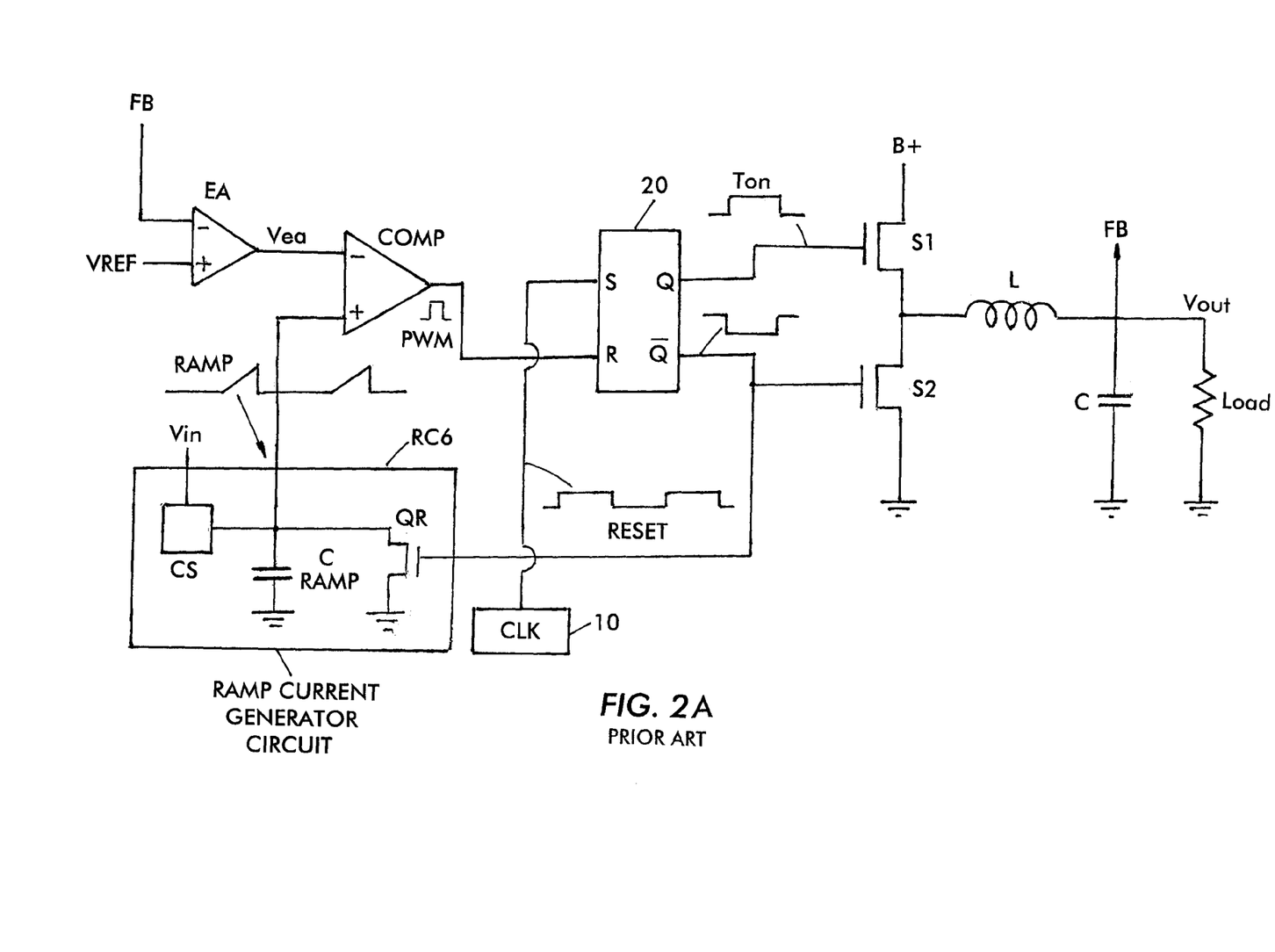
FIG. 2A shows a simplified prior art converter circuit showing how the ramp signal is generated and controls the converter operation.

FIG. 2A shows a simplified prior art synchronous buck converter circuit, showing how the ramp is generated and how it controls the converter. The converter switching frequency is controlled by a clock generator 10. The clock generator provides a signal to an SR latch 20. This sets the Q output high, which turns ON the control switch S1. The Q-not output is of course then set low and switch S2 is OFF. A transistor $Q_R$ of ramp current generator circuit RCG is also OFF at this time allowing the capacitor $C_{ramp}$ to charge through the current source CS from a voltage $V_{IN}$. The ramp voltage is developed across the capacitor $C_{ramp}$. When the ramp voltage on the capacitor $C_{ramp}$ exceeds the output voltage Vea of an error amplifier EA, the comparator signal COMP goes high, which resets the latch 20 thereby turning OFF switch S1 and turning ON switch S2. A dead time circuit, shown, ensures a dead time between the on-times of switches S1 and S2. The high Q-not output of the latch 20 turns on transistor $Q_R$ discharging the capacitor. The next time the clock goes high again, the latch 20 is again set, restarting the cycle turning ON switch S1, turning OFF switch S2 and turning OFF switch $Q_R$, allowing the ramp to restart.

The error amplifier EA receives a feedback signal from the converter output at FB and compares it to a voltage reference $V_{REF}$, which sets the output voltage of the converter. If the load current increases and the output voltage of the converter decreases, Vea goes higher, thereby increasing the on time of switch S1 to drive the output voltage higher. If the output current through the load decreases, increasing the output voltage, FB increases and the output of the error amplifier Vea goes lower, resulting in a decreased on time of switch S1.

Figure 3:
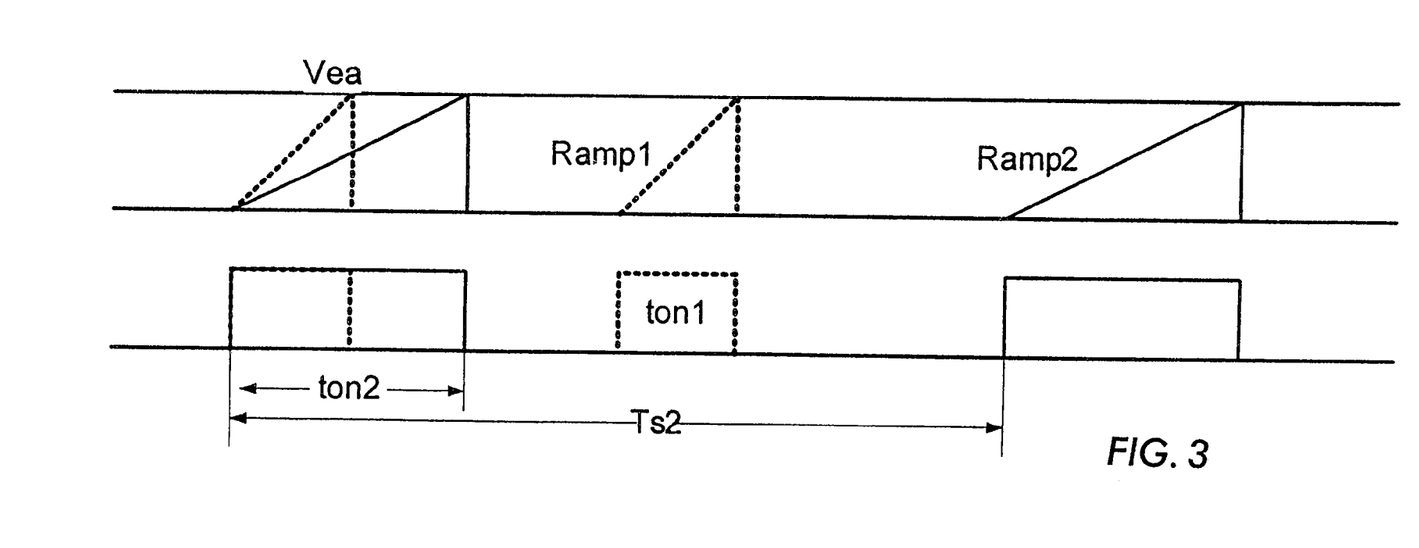
FIG. 3 is a graph of ramp signals in a converter circuit according to the present invention when in DCM.

FIG. 3 shows the concept of the invention. In FIG. 3, the slope of ramp Ramp1 of FIG. 2 is indicated by a dotted line. This is the same ramp as in the prior art. The slope of ramp Ramp2 is decreased by two over ramp Ramp1. In this case, cycle switching frequency having period Ts2 will be reduced by two or halved in comparison with cycle switching frequency of period Ts1 to produce the same output current as that generated with ramp Ramp1. This results in improved efficiency due to the reduced switching frequency.

Figure 4:
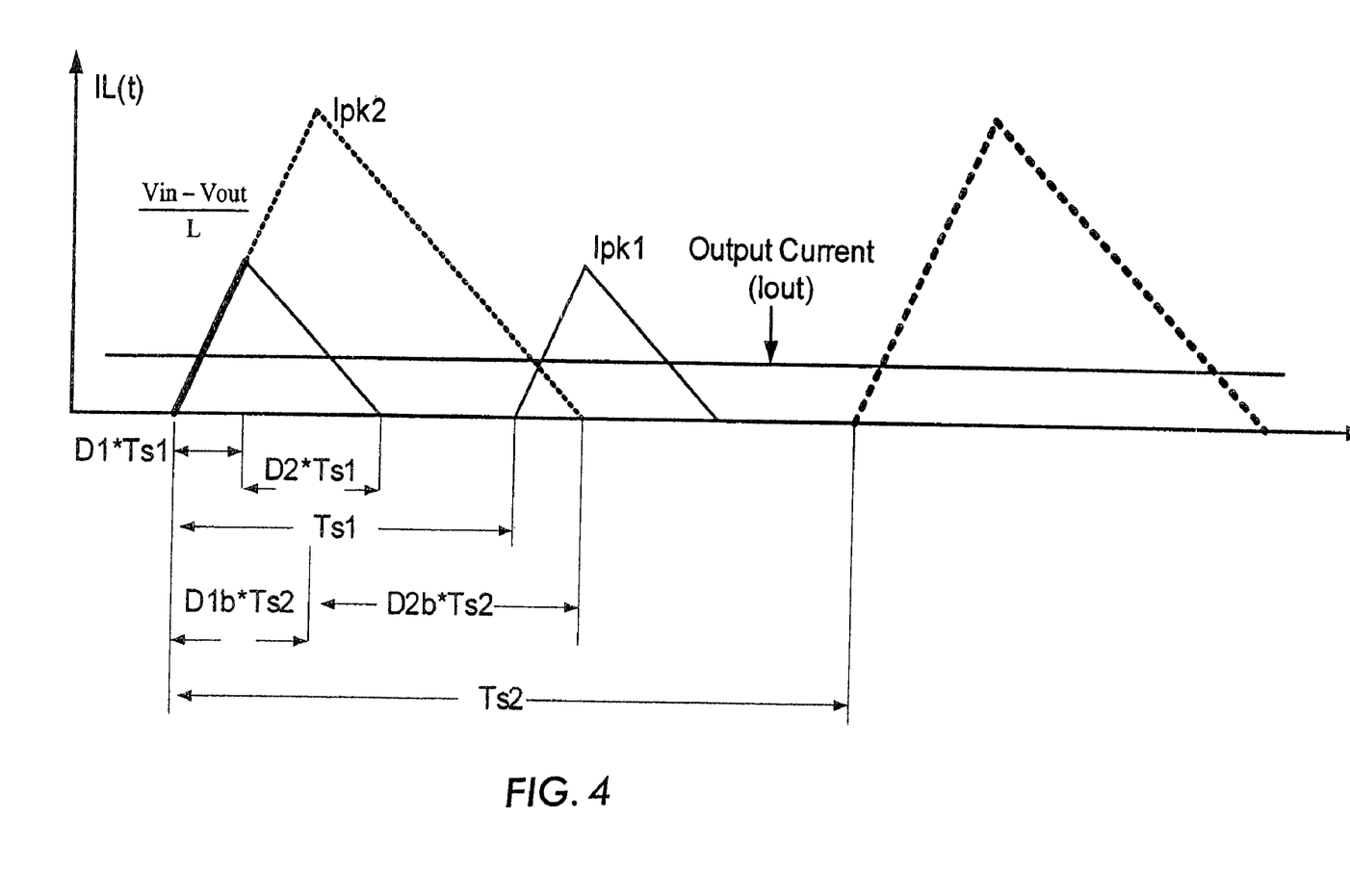
FIG. 4 is a graph showing the inductor current waveform in accordance with a prior art ramp and using a ramp generated in accordance with the present invention.

FIG. 4 illustrates inductor currents $I_{pk1}$ and $I_{pk2}$ for ramps Ramp1 and Ramp2 producing the same output current $I_{out}$. This shows why the reduced cycle switching frequency according to the present invention provide the same output current as the switching frequency of existing converters. The output current $I_{out}$ is the average inductor current in a cycle. The inductor current at peaks of ramps Ramp1 and Ramp2 are $I_{pk1}$ and $I_{pk2}$ respectively. The following equations show the relationship between inductor current, output current, and the cycle periods.

$$Iout = \langle I_L(t) \rangle = \frac{1}{Ts}\int_0^{Ts} I_L(t) \cdot dt$$

$$Iout = \frac{1}{2} \cdot Ipk1 \cdot (D1 + D2) = \frac{1}{2} \cdot Ipk2 \cdot (D1b + D2b)$$

$$Ipk1 = \frac{Vin - Vout}{L} \cdot D1 \cdot Ts1; \; Ipk2 = \frac{Vin - Vout}{L} \cdot D1b \cdot Ts2$$

$$D1b \cdot Ts2 = 2 \cdot D1 \cdot Ts1; \; D2b \cdot Ts2 = 2 \cdot D2 \cdot Ts1$$

$$\therefore Ts2 = 2 \cdot Ts1$$

Figure 5:
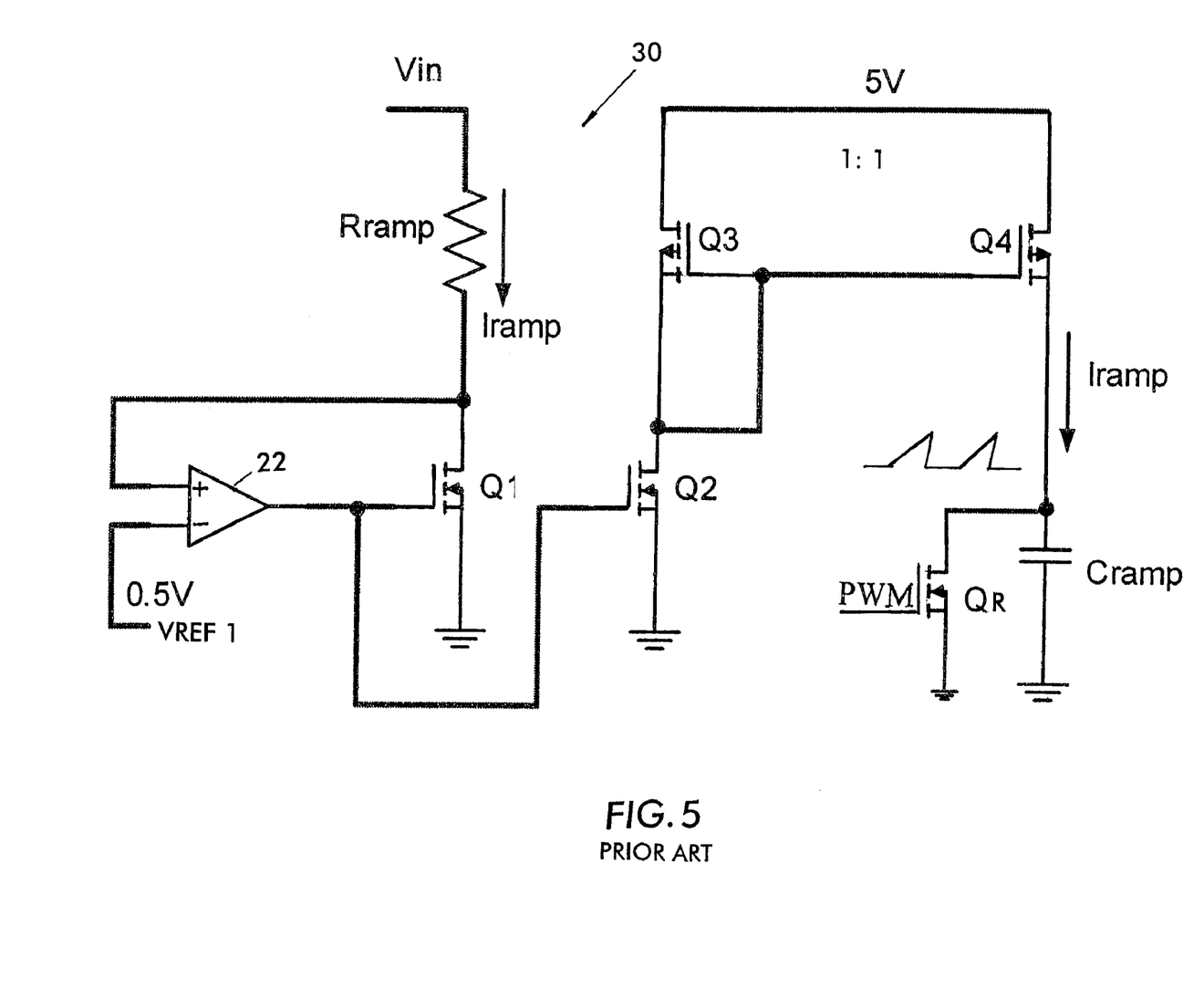
FIG. 5 is a diagram of a prior art circuit for generating a ramp.

FIG. 5 illustrates a prior art circuit 30 for generating the ramp, shown as circuit RCG of FIG. 2A. It includes five transistors Q1-Q4 and QR, a comparator 22 receiving a reference voltage of, for example, 0.5 V, at its inverting terminal, a resistor $R_{ramp}$, which is an external component allowing setting of the slope of the ramp, and a capacitor $C_{ramp}$. The circuit 30 may be a part of an integrated circuit. The current $I_{ramp}$ flowing through resistor $R_{ramp}$ will be the same in both CCM and DCM.

A first terminal of resistor $R_{ramp}$ is connected to a voltage source $V_{in}$, and its second terminal is connected to the drain terminal of transistor Q1 and to the non-inverting terminal of the amplifier 22. The output terminal of the amplifier 22 is connected to gate terminals of transistors Q1 and Q2. The drain terminal of transistor Q2 is connected to the source terminal of transistor Q3 (P-channel) and to the interconnected gates of transistors Q3 and Q4. The source terminal of transistor Q4 (P-channel) is connected to the drain terminal of transistor QR and to a first terminal of capacitor $C_{ramp}$. A second terminal of capacitor $C_{ramp}$ is connected to ground. The gate terminal of transistor QR is controlled by the PWM signal re-set of FIG. 2A. The drains of transistors Q3 and Q4 are connected to the logic voltage supply.

The voltage at the non-inverting input of the amplifier 22 drives the amplifier 22 on to turn on transistor Q1. This generates a constant current $I_{Ramp}$ through transistor Q1. Amplifier 22 drives transistor Q1 to maintain this constant current. The amplifier 22 output controls transistor Q2 in the same way to reproduce the contact ramp current in transistor Q3, which is one half of a 1:1 current mirror circuit. The current in transistor Q3 is mirrored to transistor Q4, charging capacitor $C_{ramp}$ and generating the ramp signal. Capacitor $C_{ramp}$ is reset by transistor QR by the PWM reset signal to terminate the ramp when the ramp signal reaches the error amplifier voltage signal Vea (see FIGS. 2 and 2A).

Figure 6:
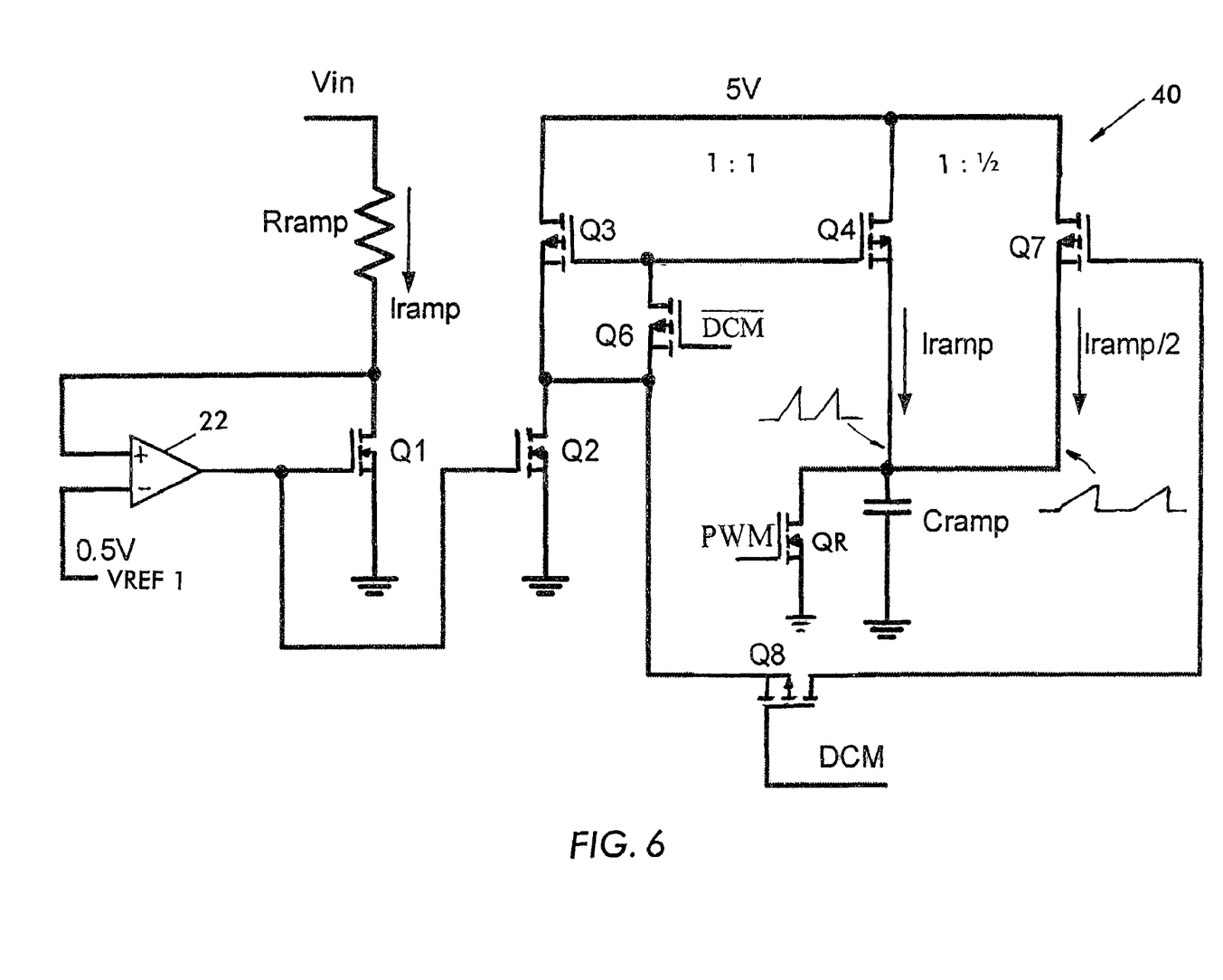
FIG. 6 is a diagram of a circuit for generating a ramp in accordance with the present invention.

FIG. 6 illustrates a circuit 40 according to the invention, which is a modification of circuit 30. This circuit is used to change the ramp slope in DCM. The circuit 40 includes three additional transistors Q6-Q8. Transistor Q6 is P-channel and is inserted to replace a connection, which exists in the circuit 30 between the drain terminal of transistor Q2 and the interconnected gate terminals of transistors Q3 and Q4. The source terminal of transistor Q6 is connected to the source terminal of transistor Q3 and the drain terminal of transistor Q2. The drain terminal of transistor Q6 is connected to the interconnected gate terminals of transistors Q3 and Q4. P-channel transistor Q7 is parallel connected to P-channel transistor Q4, with drain and source terminals being respectively connected. The source terminal of P-channel transistor Q8 is connected to the source terminal of transistor Q6 and the drain terminal of transistor Q8 is connected to the gate terminal of transistor Q7. Gate terminals of transistors Q8 and Q6 are controlled by a DCM signal, and the inverse DCM signal, respectively. When the DCM signal is low, transistor Q8 will turn ON, turning ON transistor Q7, which is designed to source half the current of transistor Q4. Transistor Q6 is turned OFF, turning OFF transistor Q4 and disabling the 1:1 current mirror comprising transistors Q3 and Q4. Instead, the 1:5 current mirror comprising transistors Q3 and Q7 is enabled by the ON transistor Q8. Thus, transistor Q3 forms a common leg with the current mirror circuit comprising transistors Q3 and Q4 and a common leg with the current mirror circuit comprising transistors Q3 and Q7. The slope of the ramp will decrease by half. Accordingly, when DCM is selected, the ramp slope is reduced by half.

In a design of an integrated circuit, current mirrors with any desired ratio can be set by the width and length of matching pairs of MOSFETs. Thus, transistors Q3 and Q4 form a 1:1 current mirror and transistors Q3 and Q7 form a 2:1 current mirror.

The following equation shows the power loss of the gate driver of the present invention with improved system efficiency. This power loss is directly proportional to the cycle switching frequency.

$$Pdr = \frac{1}{Ts}\int_0^{Ts} V\,dr \cdot Idr \cdot dt = Fs \cdot Vdr \cdot Qtotal,$$

where Vdr is the voltage to turn on the MOSFET; Qtotal is the total charge of MOSFET.

Figure 7:
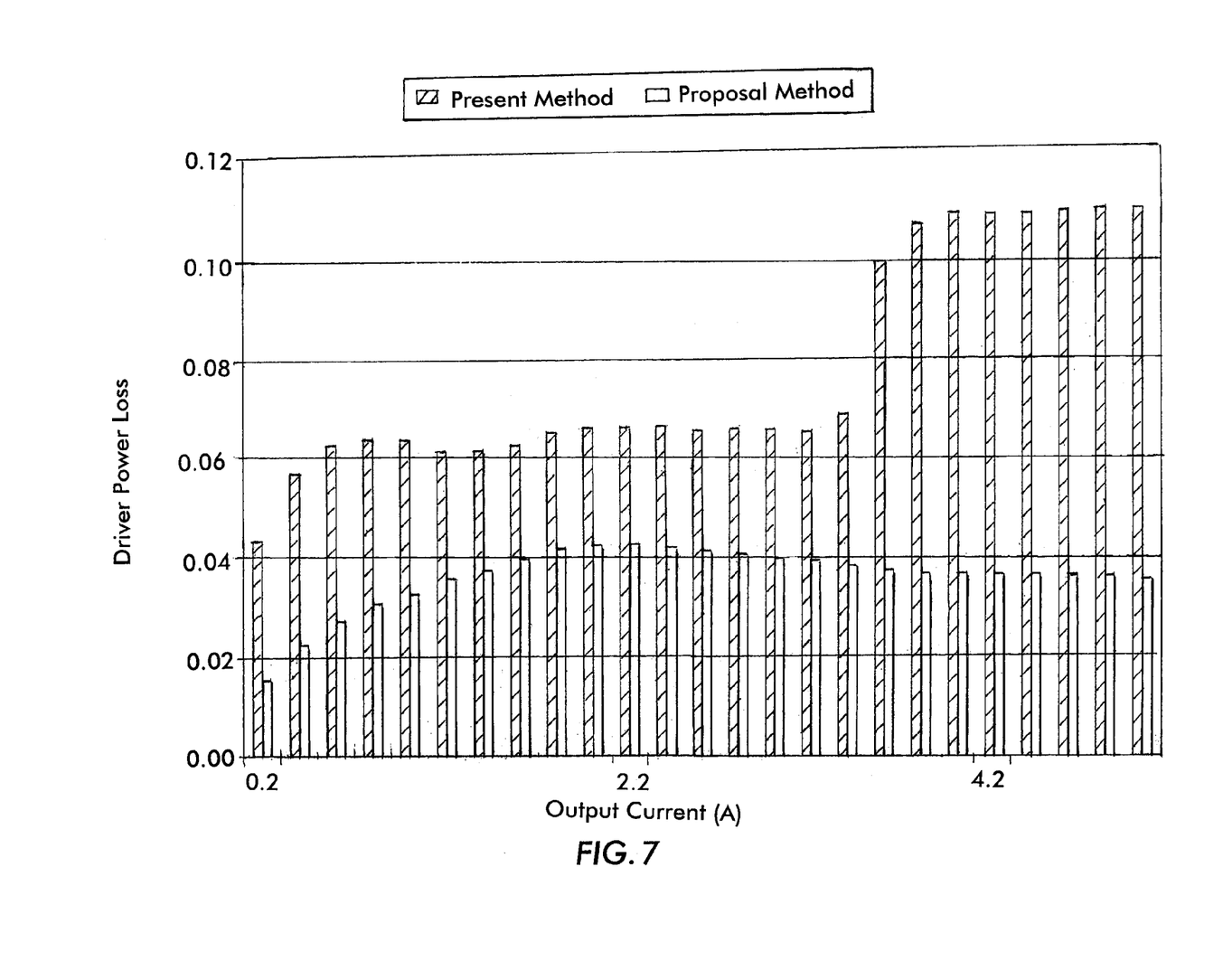
FIG. 7 is a graph illustrating gate driver power loss in a synchronous buck converter using a prior art ramp and that using a ramp generated in accordance with the present invention.
Figure 8:
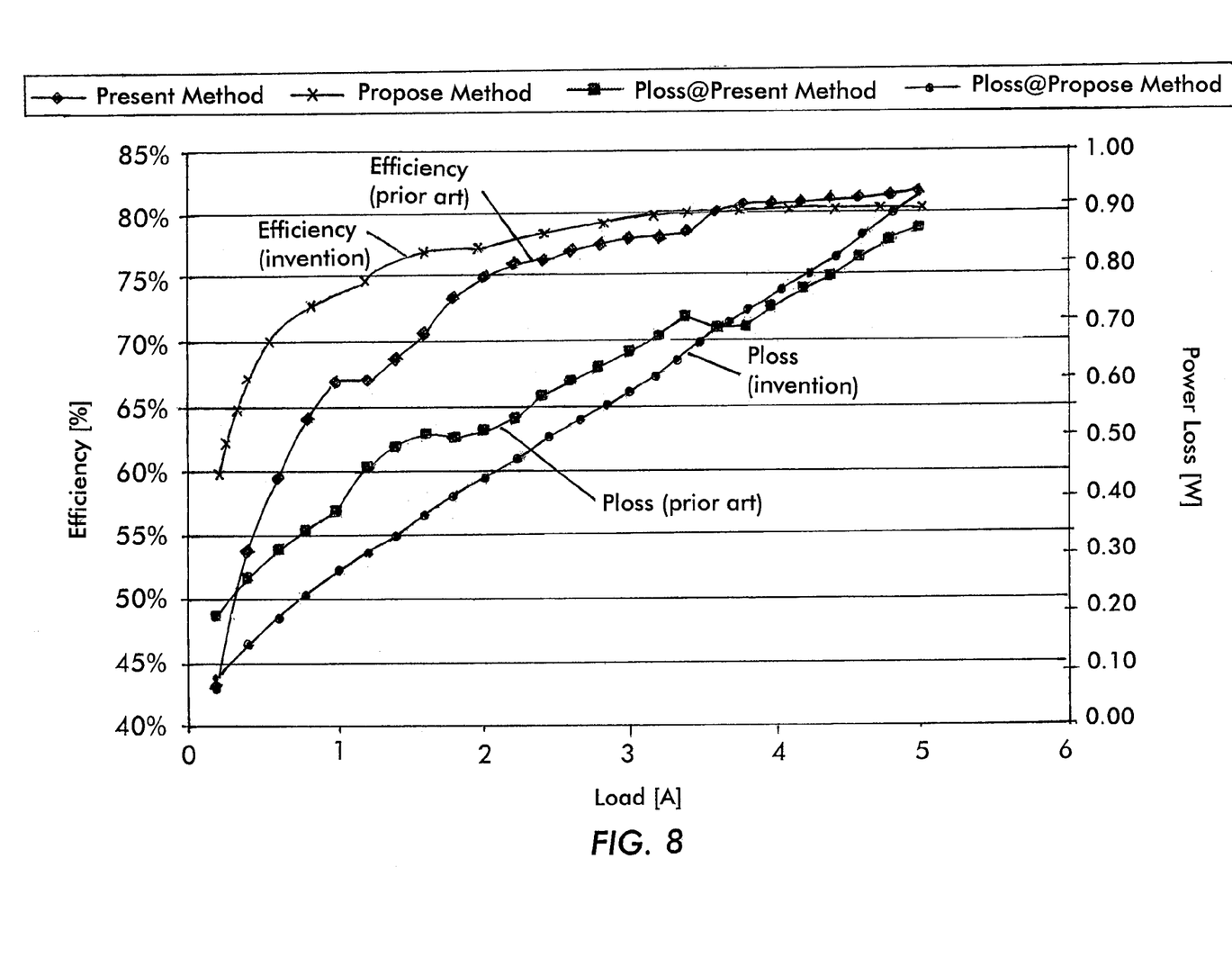
FIG. 8 is a graph illustrating efficiency of a synchronous buck converter using a prior art ramp and that using a ramp generated in accordance with the present invention.

FIG. 7 shows the comparison of driver power loss between the prior art and a gate driver employing the present invention. FIG. 8 shows the improvement of efficiency and power loss. The present invention thus improves the converter efficiency.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A ramp adjustment circuit for a voltage converter including a gate driver for controlling series connected high- and low-side switches connected across DC voltage and coupled at an output node connected to a load through an inductor such that the converter operates in a continuous conduction mode (CCM) or a discontinuous conduction mode (DCM), the circuit comprising:
   a first current generating circuit for providing a first current signal for generating a first ramp signal;
   a second current generating circuit for providing a second reduced current signal for generating a second ramp signal having a reduced slope when the first current generating circuit is disabled and the second current generating circuit is enabled; and
   a circuit for enabling the first current generating circuit and disabling the second current generating circuit when the converter is in CCM and enabling the second current generating circuit and disabling the first current generating circuit when the converter is in DCM thereby providing the first current signal when the converter is in CCM to provide the first ramp signal and providing the second reduced current signal when the converter is in DCM to provide the second reduced slope ramp signal.

2. The circuit of claim 1, wherein the first and second current generating circuits are coupled to a capacitor and wherein the capacitor charges at a first rate when charged by the first current generating circuit and a second reduced rate when charged by the second current generating circuit.

3. The circuit of claim 2, further comprising a switch for discharging the capacitor in response to a reset signal.

4. The circuit of claim 2, wherein the second circuit generating circuit charges the capacitor at half the rate of the first current generating circuit.

5. The circuit of claim 1, wherein the circuit for enabling the first current generating circuit and disabling the second current generating circuit and vice versa comprises a first switch for switching in the first current generating circuit and a second switch for switching out the second current generating circuit when the converter is in CCM, the first switch switching out the first current generating circuit and the second switch switching in the second current generating circuit when the converter is in DCM.

6. The circuit of claim 5, wherein the first current generating circuit comprises a first current mirror circuit having a first current mirror ratio resulting in said first current signal and the second current generating circuit comprises a second current mirror circuit having a second current mirror ratio resulting in said second reduced current signal.

7. The circuit of claim 6, wherein the first and second current mirror circuits have a first common leg through which a current to be mirrored flows, the first current mirror circuit comprising a second leg mirroring the current in the first leg on said first current signal and the second current mirror circuit comprising a third leg mirroring the current in the first leg as said second reduced current signal, and wherein the first switch is connected to enable and disable the first current mirror circuit and the second switch is connected to enable and disable the second current mirror circuit.

8. The circuit of claim 7, wherein the current to be mirrored flowing in the first common leg is set by a constant current reference circuit generating a reference current from a voltage source flowing through a resistance.

9. The circuit of claim 8, wherein the resistance of the constant current reference circuit comprises an external resistor for setting the slope of the first current signal, and further comprising an amplifier for regulating said reference current constant.

10. The circuit of claim 9, wherein the reference current flowing through the external resistor is the same in CCM and DCM.

* * * * *